United States Patent [19]

Basseen et al.

[11] Patent Number: 5,107,919

[45] Date of Patent: Apr. 28, 1992

[54] AIR DRYER FOR PNEUMATIC SYSTEMS

[75] Inventors: Sanjiv K. Basseen, Oak Ridge; Richard A. Harlan, Wartburg; Masoud Zarif, Knoxville, all of Tenn.

[73] Assignee: Pioneer Air Systems, Inc., Wartburg, Tenn.

[21] Appl. No.: 709,324

[22] Filed: Jun. 3, 1991

[51] Int. Cl.⁵ ............................................. F28D 7/10
[52] U.S. Cl. .................... 165/47; 165/113; 165/141; 165/155; 62/93; 62/95
[58] Field of Search ............... 62/93, 95; 165/47, 113, 165/141, 145, 155, 176, 177

[56] References Cited

U.S. PATENT DOCUMENTS

| | | | |
|---|---|---|---|
| 826,773 | 7/1906 | Engleifner | 165/141 |
| 938,779 | 11/1909 | Morrison | 165/155 |
| 1,960,325 | 5/1934 | Wadley | 165/155 |
| 2,643,863 | 6/1953 | Buschow | 165/141 |
| 2,682,157 | 6/1954 | Boling et al. | 62/122 |
| 3,358,749 | 12/1967 | Chisholm et al. | 165/141 |
| 3,359,753 | 12/1967 | Fiedler et al. | 62/317 |
| 3,507,324 | 4/1980 | Mueller | 165/164 |
| 3,578,075 | 5/1971 | Winters | 165/177 |
| 3,583,415 | 6/1971 | Smith | 137/3 |
| 3,722,583 | 3/1973 | Fiedler | 165/156 |
| 3,734,174 | 5/1973 | Bloxham et al. | 165/177 |
| 3,889,746 | 6/1975 | Laffranchi | 165/155 |
| 4,004,634 | 1/1977 | Habdas | 165/155 |
| 4,193,443 | 3/1980 | Nanaumi et al. | 165/66 |
| 4,194,560 | 3/1980 | Matsuzaki | 165/141 |
| 4,235,081 | 11/1980 | Dowling | 62/93 |
| 4,242,877 | 1/1981 | Geerkens | 62/93 |
| 4,253,315 | 3/1981 | Fiedler | 62/404 |
| 4,254,826 | 3/1981 | Adams | 165/143 |
| 4,638,852 | 1/1987 | Basseen et al. | 165/47 |
| 4,761,968 | 8/1988 | Basseen et al. | 62/271 |
| 4,834,172 | 5/1989 | Duran | 165/143 |

FOREIGN PATENT DOCUMENTS 470955 10/1914 France ........................... 165/141
270250 3/1928 United Kingdom .

*Primary Examiner*—Allen J. Flanigan
*Attorney, Agent, or Firm*—Pitts and Brittian

[57] ABSTRACT

An improved air dryer for pneumatic systems (10). The improved air dryer (10) employs air-to-air and an air-to-refrigerant heat exchanger portions (12-14) that are substantially parallel and coextensive. Each heat exchanger portion (12-14) is made up of a plurality of tube units (16-52), each tube unit (16-52) having three concentric tubes (22-24-26-58-60-68). The intermediate tube (60) of the air-to-refrigerant portion (14) includes a helically deformed central portion (66) to increase surface area and create turbulence within adjacent passageways (70-74). The tubes (16-52) terminate at each end in separate header units (34-40-46-80-86-92). Incoming air is passed co-currently, then countercurrently, in the-air-to-air portion (12) with air that has been dried, whereupon a pre-cooling stage is achieved. This pre-cooled air is then passed counter-currently, then co-currently, to refrigerant in the air-to-refrigerant portion (14) for causing condensation of moisture therein. This cool air is passed through a moisture separator (126), with the dried air being recycled through the air-to-air portion (12) prior to use. The components are fabricated from standard tubing elements. This configuration increases heat transfer and substantially reduces the required tubing length.

9 Claims, 4 Drawing Sheets

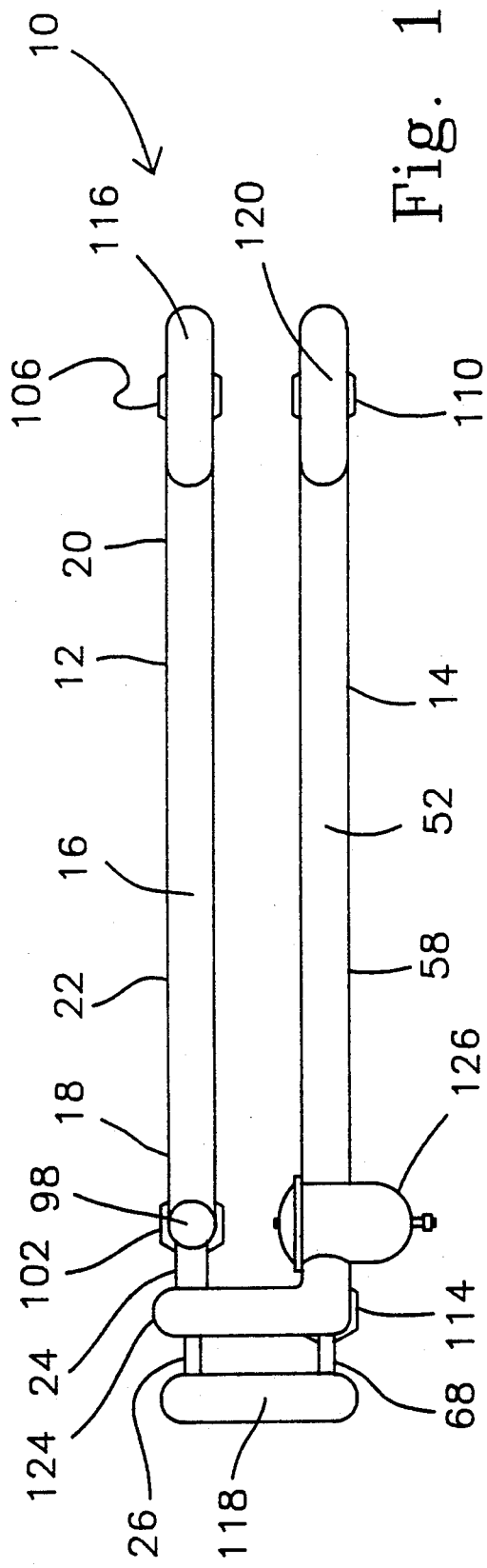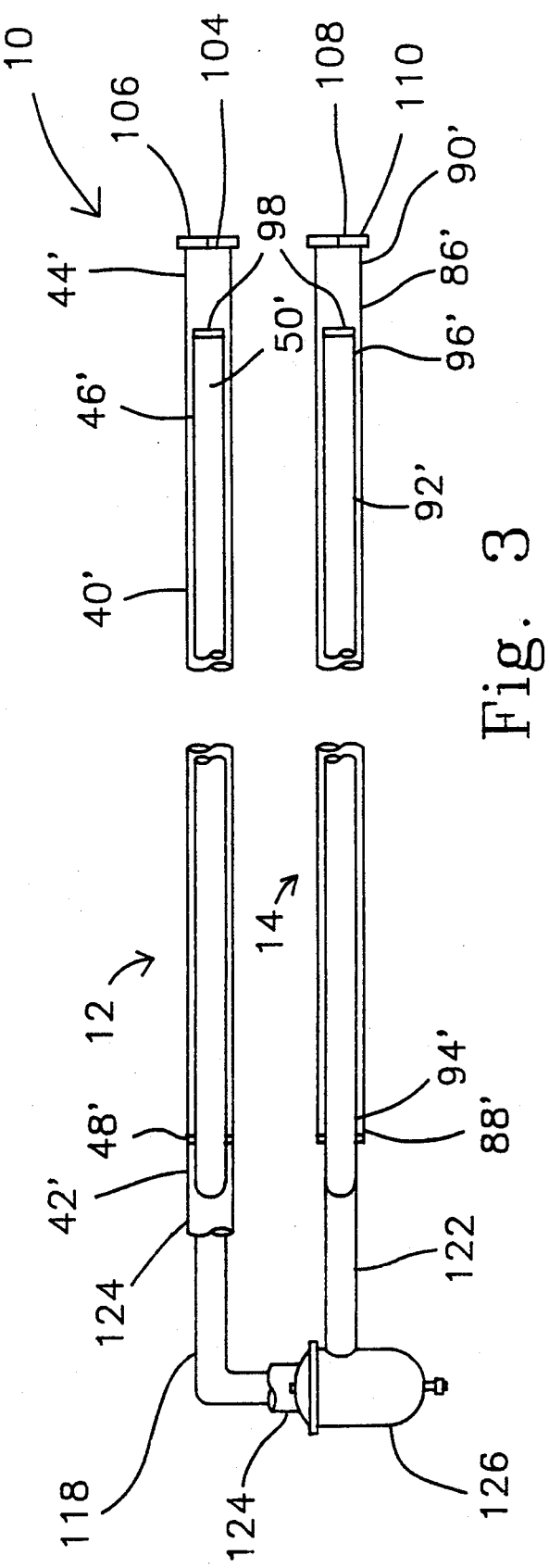
Fig. 1
Fig. 3

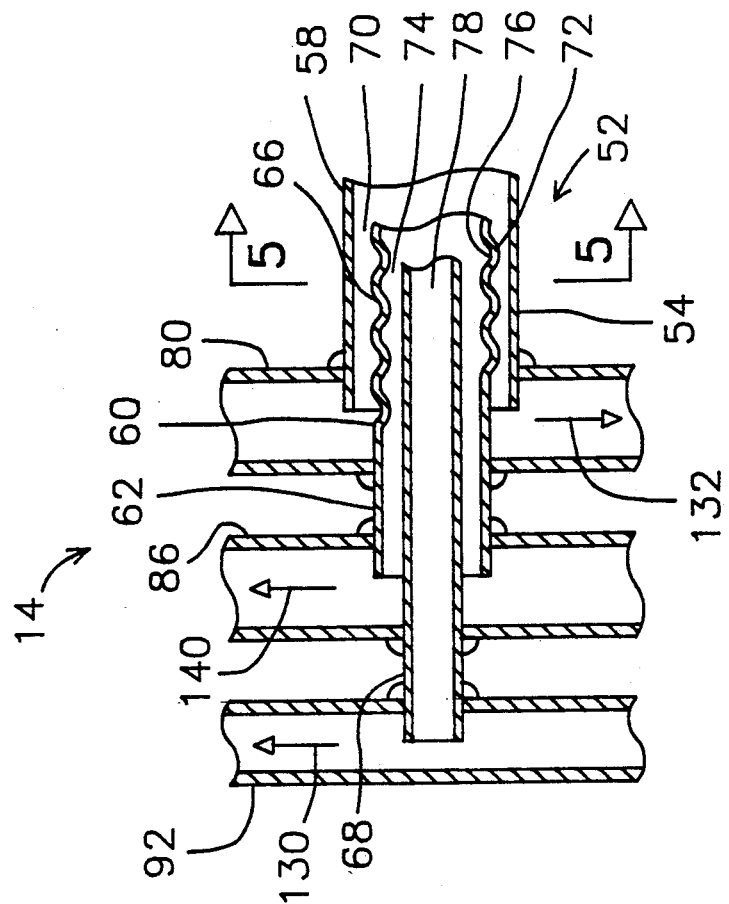
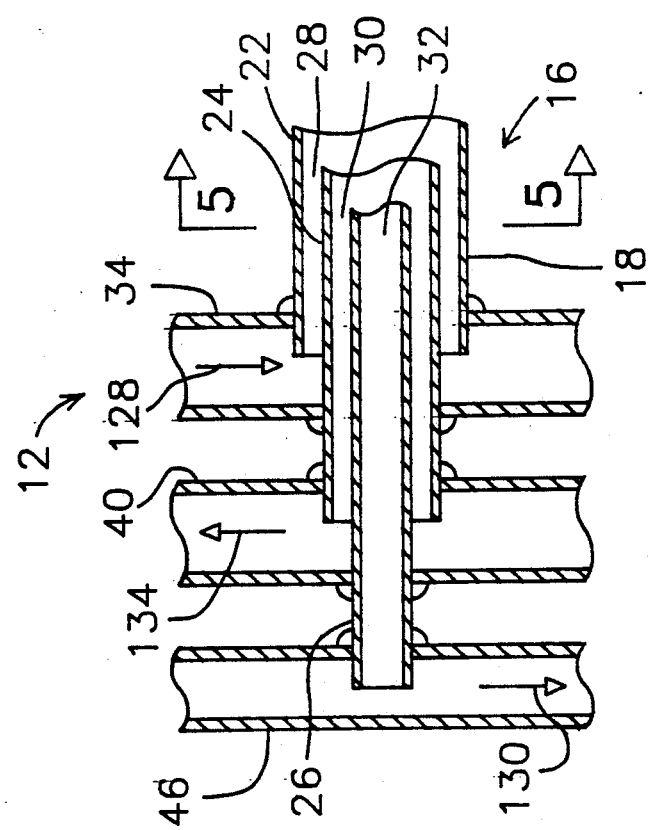
Fig. 4B
Fig. 4A

AIR DRYER FOR PNEUMATIC SYSTEMS

DESCRIPTION

1. Technical Field

This invention relates to the field of heat exchangers. More specifically, this invention relates to an improved compact and efficient heat exchanger for removing moisture from the air in pneumatic systems.

2. Background Art

When air is compressed for use in pneumatic systems and the like, the temperature of the air is raised significantly in the compressor. For example, the outlet air temperature from the compressor may be as high as 350° F. Air at this temperature tends to contain a significant amount of moisture. It is conventional practice to provide some form of moisture removal equipment in the exit stream to remove the excess moisture prior to the use of the compressed air. This is particularly essential when the compressed air is used for machine tool air motors, for painting or for other similar applications where moisture would be detrimental.

Several forms of air dryers are known in the art. Probably the most commonly used equipment for the drying involves some piece of equipment which cools the air and then causes the moisture to condense on a surface such that it can be removed to provide air for the pneumatic systems having substantially reduced moisture content. One such device is described in U.S. Pat. No. 3,359,753, issued to M. Fiedler, et al., on Dec. 26, 1967. In this device the air is caused to pass through a porous material that is maintained at a reduced temperature by the use of a refrigerant passing through coils in this porous material. The condensed moisture is collected and removed through a suitable drain.

Another type of heat exchanger for cooling the outlet air from air compressors is shown and described in U.S. Pat. No. 4,193,443, issued to K. Nanaumi, et al., on Mar. 8, 1980. In this device the moist air first flows past tubes containing air that has been dried in this device where upon the temperature of the incoming air is moderated. The air then flows through a second portion of the heat exchanger past a plurality of baffles that are connected to tubes carrying a refrigerant. The baffles being at a reduced temperature cause the moisture to condense thereon, and to be deposited in a lower portion of the heat exchanger where they are withdrawn through a suitable drain.

Still another type of heat exchanger for air drying in the compressed air art is shown in U.S. Pat. No. 4,235,081, issued to R. O. Dowling, on Nov. 25, 1980. This device performs similarly to the heat exchanger of the '443 patent, except that it is physically divided into an air-to-air heat exchanger and an air-to-refrigerant heat exchanger. The division into these two components reduces some of the cost and complexity of fabrication. Both the device of this patent and that of the '443 patent utilize a plurality of tubes about which the air flow passes to accomplish the heat exchange.

In other forms of heat exchangers for the cooling of air, it is quite conventional to have duplex tubing wherein air flows through one annulus of the duplex tubing, and refrigerant or pre-dried air flows in the other annulus. Typical are those devices disclosed in U.S. Pat. Nos. 2,682,157 issued to C. Boling, et al., on Jun. 29, 1954; 3,722,583 issued to M. Fiedler on Mar. 27, 1973; 3,734,174 issued to A. T. Bloxham, et al., on May 22, 1973; 4,242,877 issued to F. Geerkens on Jan. 6, 1981; and 4,253,315 issued to M. Fiedler on Mar. 3, 1981; and French Patent No. 470,955 issued on Oct. 8, 1914.

Other forms of heat exchangers are designed specifically for heating a selected fluid. Typical are those described in U.S. Pat. Nos. 826,773 issued to F. Engleitner on Jul. 24, 1906; 938,779 issued to J. W. Morrison on Nov. 2, 1909; 1,960,325 issued to C. P. Wadley on Mar. 21, 1933; and 3,583,415 issued to V. D. Smith on Jun. 8, 1971; and United Kingdom Patent No. 270,250 issued on Mar. 15, 1928.

Still other forms of heat exchangers are designed generally for selectively heating or cooling a selected fluid. Such heat exchangers are typically like those disclosed in U.S. Pat. Nos. 3,507,324 issued to P. Mueller on Apr. 21, 1970; 3,889,746 issued to E. Laffranchi on Jun. 17, 1975; and 4,254,826 issued to C. L. Adams on Mar. 10, 1981.

U.S. Pat. No. 4,638,852 issued to S. K. Basseen and R. A. Harlan on Jan. 27, 1987, the inventor and assignee of which are common with the present invention, discloses a heat exchanger for removing moisture from air utilizing an assembly of tube units each having three concentric tubes wherein the individual tubes terminate in parallel header elements such that distinct flow can be maintained in each of the tubes and the heat transfer surface is substantially increased. The '852 invention is divided into two separate heat exchangers—an air-to-air heat exchanger and an air-to-refrigerant heat exchanger—for ease of construction. The '852 invention yields a heat exchanger substantially reduced in size over other similar devices. The present invention is an improvement upon the '852 invention.

Accordingly, it is an object of this invention to provide a heat exchanger wherein sufficient cooling surface is provided to dehumidify the air for pneumatic systems, whereby the heat exchanger has a reduced volume for a specific capacity, such that cost of manufacture is substantially reduced.

It is also an object of this invention to provide an improved heat exchanger using a triple concentric tube array with multiple units in parallel, whereby a greater surface area is provided for heat exchange, thus increasing the efficiency of the heat exchanger.

Another object of this invention is to provide a means whereby the surface area on which air-to-refrigerant heat exchange occurs is greatly increased and the flow of moist air is disturbed, thereby causing a greater percentage of the moist air to directly contact the heat exchange median and thus further increasing the efficiency of the heat exchanger.

Still another object of this invention is to provide a means for the removal of moisture from the heat exchanger after condensation.

DISCLOSURE OF THE INVENTION

In accordance with the present invention, a heat exchanger is constructed for removing moisture from air utilizing an assembly of tube units each having three concentric tubes wherein the individual tubes terminate in parallel header elements such that distinct flow can be maintained in each of the tubes and the heat transfer surface is substantially increased. The heat exchanger is divided into two sections, the first being an air-to-air heat exchanger for pre-cooling the incoming air by the air that has been dried, and the second being an air-to-refrigerant heat exchanger wherein the principal cooling of the air is achieved for moisture removal. The air-to-refrigerant heat exchanger includes an intermediate tube with a central section having a substantially helical configuration for an increase in surface area over which heat transfer takes place. Through the use of three concentric tubes and the array of headers, the present invention is readily fabricated, and the resultant heat exchanger for a given capacity is substantially reduced in size over that required using devices of the prior art.

BRIEF DESCRIPTION OF THE DRAWINGS

The above mentioned features of the invention will become more clearly understood from the following detailed description of the invention read together with the drawings in which:

FIG. 1 is a front elevation view of the improved air dryer constructed in accordance wit several features of the present invention.

FIG. 3 is a side elevation view taken from the right side of the assembly of FIG. 1.

FIG. 4A illustrates a cross-sectional view showing a typical construction of a juncture of the triplex tubing of the air-to-air heat exchanger portion of the present invention with appropriate headers.

FIG. 4B illustrates a cross-sectional view showing a typical construction of a juncture of the triplex tubing of the air-to-refrigerant heat exchanger portion of the present invention with appropriate headers.

BEST MODE FOR CARRYING OUT THE INVENTION

Figure 2A:
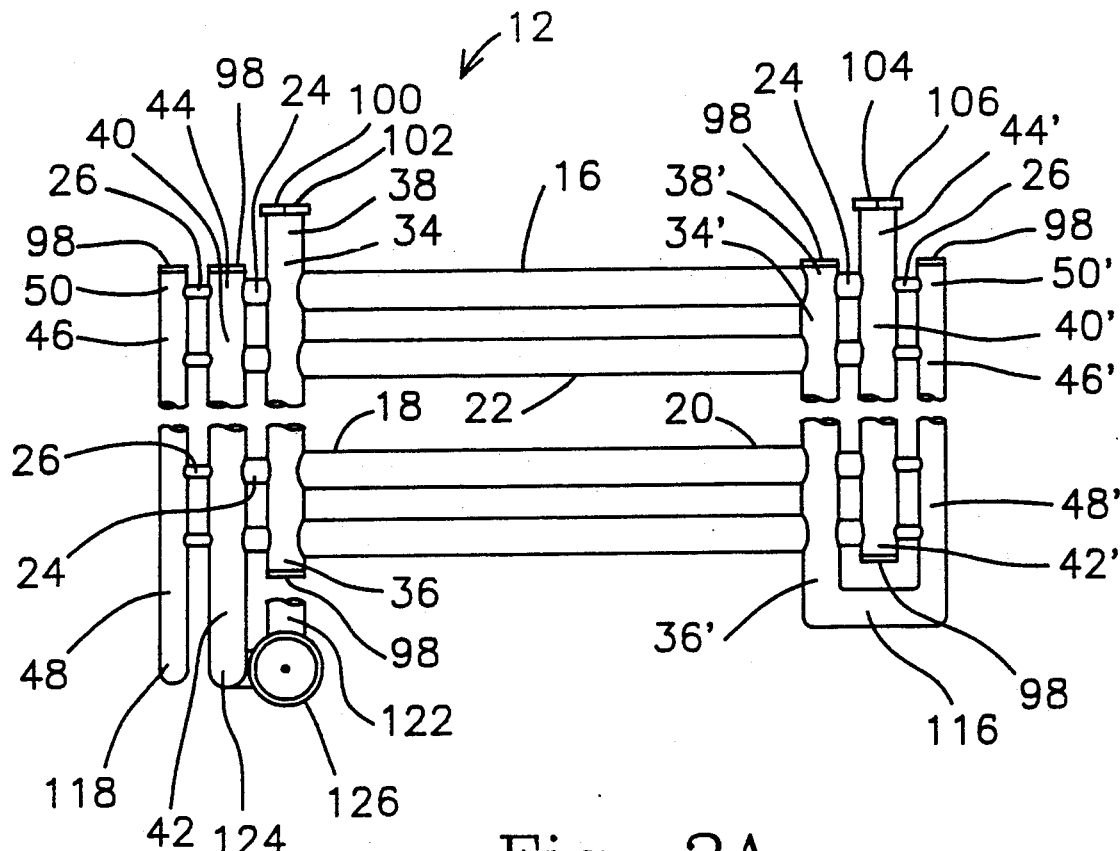
FIG. 2A illustrates a plan view of the air-to-air heat exchanger portion of the improved air dryer of FIG. 1.

An improved air dryer for pneumatic systems incorporating various features of the present invention is illustrated generally at 10 in the figures. The improved air dryer 10 provides a heat exchanger fabricated from standardized materials and configured such as to minimize the required overall size. Moreover, in the preferred embodiment the improved air dryer 10 is designed such that no bending of tubing is required thereby furthering economic efficiency.

Referring to FIG. 1, shown therein is an arrangement of an air-to-air heat exchanger section 12, positioned above and generally parallel to an air-to-refrigerant heat exchanger portion 14. The air-to-air heat exchanger 12 is made of a plurality of substantially parallel tube units 16. Each of these tube units 16 consists of three concentric tubes as illustrated in the cross section shown in FIG. 5A. There is an outer tube 22, an intermediate tube 24, and an inner tube 26. These tubes thus define an outer annulus 28, an intermediate annulus 30, and a central cylindrical channel 32. The first end 18 of each of these tube units 16 terminates in appropriate headers 34-40-46, respectively, and a more detailed termination thereof is illustrated in FIG. 4A. The second end 20 of the tube units 16 terminate in corresponding headers 34'-40'-46', respectively, in similar fashion as the tube units first end 18 with an opposite-hand arrangement.

Figures 5A, 5B:
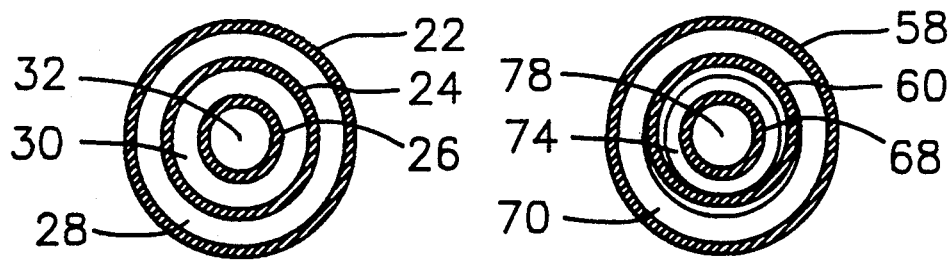
FIG. 5A illustrates a cross-sectional view taken at 5—5 of FIG. 4A showing the concentric arrangement of the triplex tubing of the air-to-air heat exchanger portion of the present invention.
FIG. 5B illustrates a cross-sectional view taken at 5—5 of FIG. 4B showing the concentric arrangement of the triplex tubing of the air-to-refrigerant heat exchanger portion of the present invention.

The air-to-refrigerant portion 14 of the present invention has a very similar construction to that of the air-to-air portion 12. The air-to-refrigerant portion 14 is made up of a plurality of substantially parallel tube units 52. Each of these tube units 52 consists of three concentric tubes as illustrated in FIG. 5A. There is an outer tube 58, an intermediate tube 60, and an inner tube 68. The intermediate tube 60 of the air-to-refrigerant portion 14 includes substantially smooth cylindrical first and further ends 62-64, respectively, connected by a central member 66 having a surface which substantially helically deformed as best seen in FIGS. 4B and 5B. The tube units 52 thus define an outer annulus 70, an intermediate annulus 74, and a central channel 78. The outer annulus 70 of each tube unit 52 is substantially cylindrical, the inner surface 72 having a generally helical configuration. The intermediate annulus 74, likewise, is substantially cylindrical with the outer surface 76 having a substantially helical configuration. Each tube unit 52 terminates at the first end 54 in appropriate headers 80-86-92 and at the second end 56 in appropriate headers 80'-86'-92'. A more detailed termination of the first end 54 of the tube unit 52 is illustrated in FIG. 4B, the second end 56 being opposite-hand therefrom.

Figure 2B:
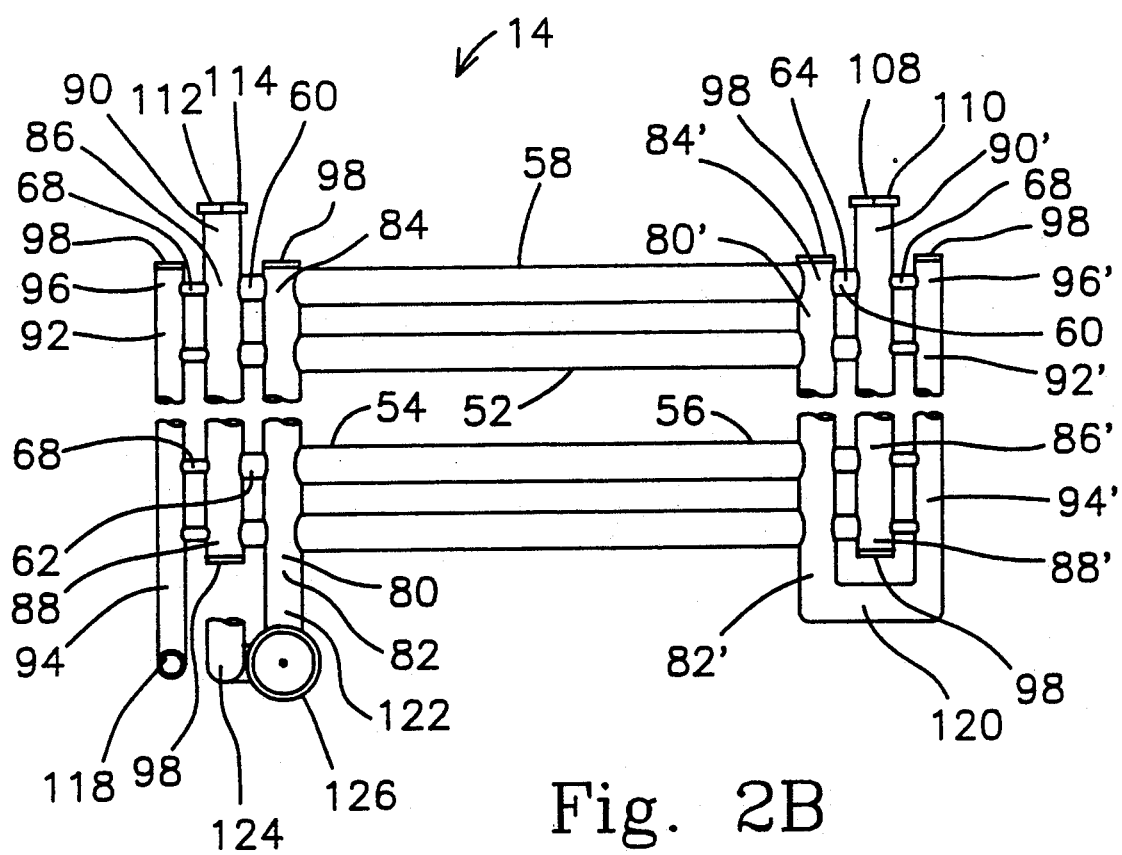
FIG. 2B illustrates a plan view of the air-to-refrigerant heat exchanger portion of the improved air dryer of FIG. 1.

Referring now specifically to FIGS. 2A and 2B, an inlet 100 to the air-to-air heat exchanger 12 is provided through a flange 102 such that heated air is directed into the second end 38 of header 34 and subsequently the outer annuli 28, following the path indicated by arrow 128. The first end 36 of header 34 is sealed with a cap 98 by a conventional method. The heated air then exits the outer annuli 28 and enters the header 34'. The headers 34'-46' are connected in fluid communication about respective first ends 36'-48' by means of a connecting member 116 such that as the heated air exits the header 34' it is directed through the connecting member 116 into the header 46' and subsequently the inner channels 32. The second ends 38'-50' of the headers 34'-46' are sealed with a cap 98 by a conventional method. The air exits the inner channels 32 and is introduced into the header 46 as pre-cooled air. The pre-cooled air then exits the first end 48 of header 46 and is introduced into the air-to-refrigerant heat exchanger 14 through connecting member 118. The second end 50 of header 46 is sealed with a cap 98 by a conventional method. Air which has been cooled and dried is introduced into the air-to-air heat exchanger 12 through a connecting member 124 connected to the first end 42 of header 40, the second end 44 of the header 40 being sealed with a cap 98 by a conventional method. This air thus enters the intermediate annuli 30 proximate the tube unit first end 18. As the dry, cooled air passes through the intermediate annuli 30, heat is transferred from the heated air to the cooled air through the inner tubes 26 and the intermediate tubes 24. The dry, cooled air exits the intermediate annuli 30 into the header 40' and is directed to an outlet 104 through a flange 106 proximate the second end 44' of header 40' to a pneumatic system (not shown), as is shown by arrow 136. The first end 42' of the header 40' is sealed with a cap 98 by a conventional method.

The air-to-air heat exchanger header 46 is connected in fluid communication with the first end 94 of header 92 of the air-to-refrigerant heat exchanger 14 by a connecting member 118. The second end 96 of the header 92 is sealed with a cap 98 by a conventional method. The pre-cooled air thus flows through the connecting member 118 into the header 92 and subsequently into the inner channels 78 proximate the tube unit first ends 54. An inlet 108 to the air-to-refrigerant heat exchanger 14 is provided through a flange 110 such that refrigerant is directed into the second end 90' of header 86', as shown by arrow 138, and subsequently the intermediate annuli 74. The refrigerant contacts the inner tubes 68 and the helicotrema configured intermediate tubes 60, the helicotrema configured intermediate tubes 60 creating turbulence and increasing the surface area contacted by the refrigerant thus increasing the efficiency of the heat transfer. As shown by arrow 140, the refrigerant is exited from the intermediate annuli 74 and introduced into header 86, then is directed through the second end 90 of header 86 to a refrigerant outlet 112 and evacuated through flange 114 then delivered to an external refrigeration system (not shown) or is otherwise discharged as desired. The first ends 88-88' of the headers 86-86' are sealed with a cap 98 by a conventional method. The pre-cooled air flows through the inner channels 78 as depicted by arrow 130 and is discharged into header 92'. Header 92' is connected in fluid communication with header 80' proximate the respective first ends 94'-82' such that the pre-cooled air exiting the inner channels 78 is directed into the outer annuli 70 proximate the tube unit second end 56. The second ends 96'-84' of the headers 92'-80' are sealed with a cap 98 by a conventional method. The precooled air which has made a first heat transfer with the refrigerant is passed through the outer annuli 70 and exited into header 80. The inner surface 72 of the outer annuli 70 conforms to the helicotrema deformed central section 66 of the intermediate tubes 60 thus creating a greater contact surface area and turbulence within the outer and intermediate annuli 70-74, thus increasing heat transfer efficiency. The cooled air then exits the outer annuli 70 into the header 80 and subsequently into connecting member 122 through the first end 82 of header 80 as depicted by arrow 132. The second end 84 of header 80 is sealed with a cap by a conventional method.

Referring to FIGS. 2A and 2B, a separator 126 is connected in fluid communication between the air-to-refrigerant heat exchanger 14 and the air-to-air heat exchanger 12 by connecting members 122-124, respectively, for the removal of moisture from the cooled air. As is depicted by arrow 134, the output of the separator 126 is directed through the connecting member 124 to the aforementioned header 40 of the air-to-air heat exchanger 12 for the pre-cooling of heated, wet air.

As stated above, the concentric tubes 22-24-26 of the tube units 16 terminate respectively in the headers 34-40-46. This construction is illustrated in the cross-sectional drawings of FIG. 4A. It may be seen that the inner tube 26 penetrates all of the headers 34-40 and terminates in an open end midway through header 46. The inner tube 26 is sealed to the wall of headers 40-46 as with an annular braze or weld. Intermediate tube 24 penetrates header 34 and one wall of header 40 and terminates at substantially a mid-point of header 40. The intermediate tube 24 is sealed to headers 34-40 as with the same type of braze or weld. The outer tube 22 of tube unit 16 penetrates substantially one-half of header 34 and is sealed to header 34 with a corresponding braze or weld. While FIG. 4A is explained with respect to the first end 18 of the air-to-air heat exchanger 12, this same construction is utilized at the second end 20 of the air-to-air heat exchanger 12, as well as at the first and second ends 54-56 of the air-to-refrigerant heat exchanger 14. The construction of the first end 54 of the air-to-refrigerant heat exchanger 14 is depicted in cross-section at FIG. 4B.

Figure 6:
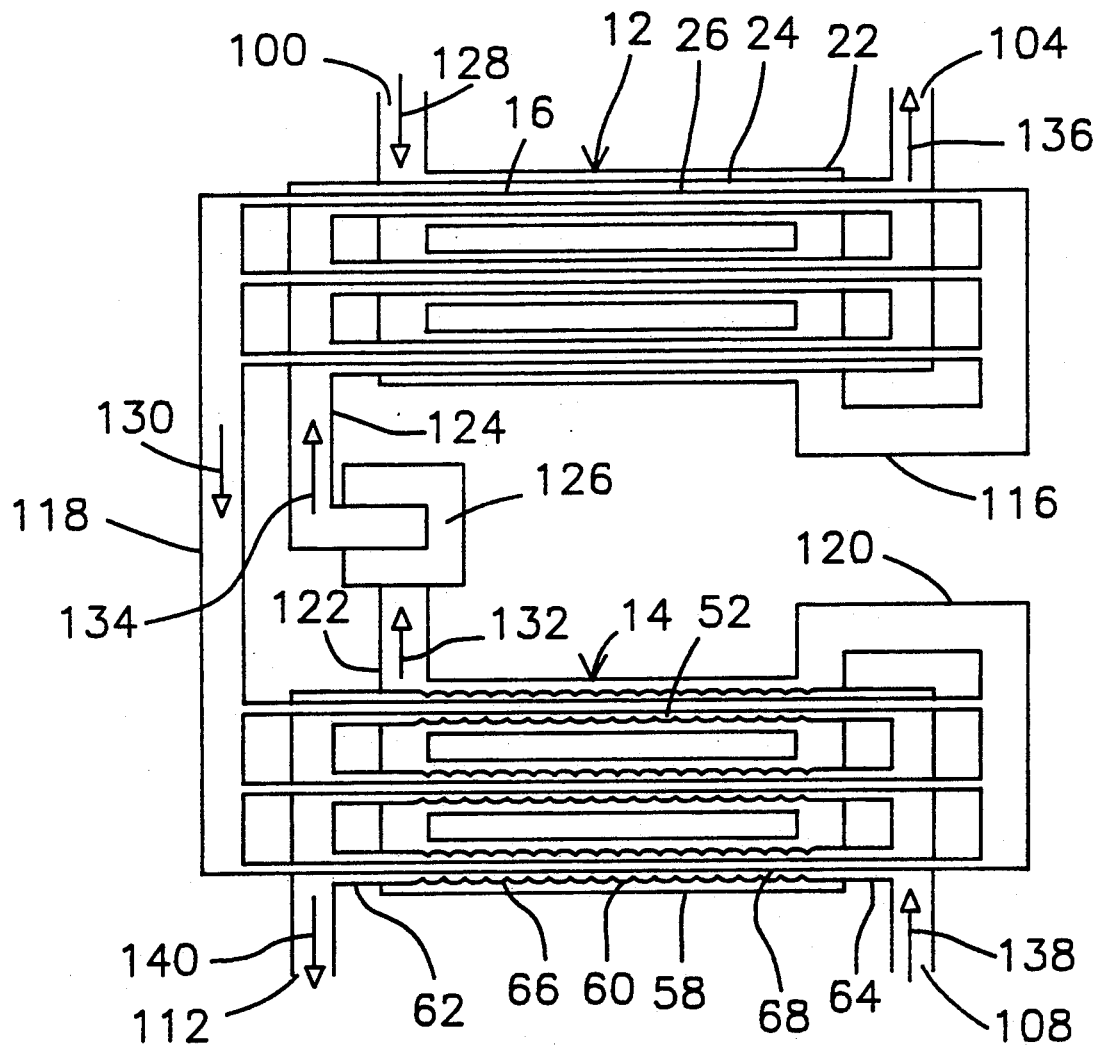
FIG. 6 is a schematic flow diagram of the heat exchanger of the present invention indicating the flow of moist air, dry air, and refrigerant through the heat exchanger.

A schematic flow diagram of the subject heat exchanger 10 is shown in FIG. 6. The incoming warm, moist air is directed into header 34 as set forth above. This air then flows through the outer annuli 28 of the tube units 16 of the air-to-air portion 12, through header 34', connecting member 116, and header 46', and is then directed through the inner channels 32 of the air-to-air heat exchanger 12. This brings about a cooling of the air which is collected in header 46 and conveyed through connecting member 118 to header 92 of the air-to-refrigerant heat exchanger 14. The pre-cooled, moist air collected in header 92 is directed into the inner channels 78 of tube units 52 of the air-to-refrigerant heat exchanger 14 and then is collected in header 92'. This air is then directed through connecting member 120, into header 80', and through the outer annuli 70 of the air-to-refrigerant heat exchanger 14. This brings about a further cooling of the moist air enabling separation of the moisture from the air. The cooled air is exits the outer annuli 70 and enters header 80, from which the air is directed through connecting member 122 and into separator 126. The moisture is then removed from the air, the dry (and cooled) air being directed through connecting member 124 and into header 40 of the air-to-air heat exchanger 12. From the header 40, the dry air is directed through the intermediate annuli 30 into header 40' and then is introduced through flange 106 into the pneumatic system for utilization. Refrigerant is introduced through flange 110 into header 86' of the air-to-refrigerant heat exchanger 14. From header 86', the refrigerant is directed through the intermediate annuli 74, into header 86, and then evacuated through flange 114 for reuse or disposal. By providing two heat transfer surfaces within each tube unit 16-52 through the use of triplex tubing, and by providing for the substantially helicotrema configured central portion 66 of the intermediate tube 60 of the tube units 52 of the air-to-refrigerant heat exchanger 14, a significantly increased area is created to thereby increase the efficiency of a heat exchanger 10 of a selected size.

Although the sizes of the components of the present invention are not limiting to the invention, the following is a description of a typical embodiment of the invention 10 for the removal of moisture from air in compressed air systems prior to the use of this air in pneumatic tools or other applications. The particular unit was designed for the handling of up to 2,000 standard cubic feet of air per minute, having an incoming air temperature of up to 350° F. The unit was fabricated from tubular copper elements which will withstand up to 250 psi. The refrigerant for this particular embodiment was Freon R-22. For the individual tube units 16-52, the outer tubes 22-58 were fabricated from 1⅝ inch o.d. copper tubing, having a length of 35¼ inches. The intermediate tube 24 of the air-to-air heat exchanger 12 was fabricated from 1⅜ inch o.d. copper tubing having a length of approximately 43½ inches. The intermediate tube 60 of the air-to-refrigerant heat exchanger 14 is fabricated from a 1⅜ inch o.d. copper tubing having a length of approximately 44¼ inches. The inner tubes 26-68 were fabricated from ¾ inch o.d. copper tubing having a length of approximately 52¼ inches. These sizes were uniform throughout both the air-to-air heat exchanger 12 and the air-to-refrigerant heat exchanger 14. The headers for receipt of the ends of the tubes were typically, for headers 34-46-80-92, copper tubing having a diameter of 3⅛ inch o.d., with the intermediate headers 40-86 having a diameter of 4⅛ inch o.d. This particular unit was constructed using forty tube units 16 in the air-to-air heat exchanger 12 and forty tube units 52 in the air-to-refrigerant heat exchanger 14. The headers in both portions in 12 and 14 had identical size. The output air from the present invention exited at a temperature range of 35° to 40° F., with a sufficiently reduced moisture content that such output air could be utilized in all types of pneumatic systems. Testing of this particular unit 10 demonstrated a reduction of between 40 and 56 percent in tube length over that required for duplex tubing, and a savings in materials of between 35 and 45 percent was achieved.

Although not shown in any of the figures, the tubing units and the headers of the present invention can be encased in thermal insulation to minimize heat losses to the atmosphere. This may be required in some applications, and may not be required in others. Furthermore, if a heat exchanger unit 10 is operated at pressures exceeding the 250 psi as stated above, the tube units and the headers can be fabricated from the materials having greater strength, e.g., stainless steel. Similar savings in materials and an increase in efficiency would be achieved.

From the foregoing description, it will be recognized by those skilled in the art that an improved air dryer for pneumatic systems offering advantages over the prior art has been provided. Specifically, the improved air dryer provides a heat exchanger fabricated from standardized materials, thus creating a substantial savings in material costs. Other economic benefits accrue from this construction as no bending of tubes is required as in other heat exchangers.

While a preferred embodiment has been shown and described, it will be understood that it is not intended to limit the disclosure, but rather it is intended to cover all modifications and alternate methods falling within the spirit and the scope of the invention as defined in the appended claims.

Having thus described the aforementioned invention, I claim:

1. An improved air dryer for removing moisture from compressed air that is to be used in a pneumatic system, said improved air dryer comprising:

a first heat exchanger portion substantially arranged in a first plane, said first heat exchanger portion having
  (a) a first plurality of substantially parallel straight tube units, each of said tube units formed of three concentric tubes defining an inner channel, an intermediate annulus and an outer annulus, each of said tube units having a first end and a further end,
  (b) first and second groups of first, second and third straight headers attached, respectively, to said first and further ends of each of said third tube units, said first header of each group being in fluid communication with said inner channels, said second header of each group being in fluid communication with said intermediate annuli and said first header of each group being in fluid communication with said outer annuli,
  (c) a first inlet attached to and in fluid communication with said first header of said first group, said first inlet adapted to receive a flow of said compressed air for said pneumatic system,
  (d) a first outlet attached to and in fluid communication with said first header of said second group,
  (e) a second inlet attached to and in fluid communication with said first outlet and said third header of said second group,
  (f) a second outlet attached to and in fluid communication with said third header of said first group,
  (g) a third inlet attached to and in fluid communication with said second header of said first group, and
  (h) a third outlet attached to and in fluid communication with said second header of said second group, said third outlet adapted to deliver demoisturized air to said pneumatic system;

a second heat exchanger portion substantially arranged in a second plane substantially parallel to said first plane, said second heat exchanger portion having
  (a) a second plurality of substantially parallel straight tube units, each of said tube units formed of three concentric tubes defining an inner channel, an intermediate annulus and an outer annulus, each of said tube units having a first end and a further end,
  (b) third and fourth groups of first, second and third straight headers attached, respectively, to said first and further ends of each of said second tube units, said third header of each group being in fluid communication with said inner channels, said second header of each group being in fluid communication with said intermediate annuli, and said first header of each group being in fluid communication with said outer annuli,
  (c) a fourth inlet attached to and in fluid communication with said second outlet of said first heat exchanger portion and said third header of said third group adapted to receive a flow of air from said first heat exchanger portion,
  (d) a fourth outlet attached to and in fluid communication with said third header of said fourth group,
  (e) a fifth inlet attached to and in fluid communication with said fourth outlet and said first header of said fourth group,
  (f) a fifth outlet attached to and in fluid communication with said first header of said third group,
  (g) a sixth inlet attached to and in fluid communication with said second header of said fourth group, and
  (h) a sixth outlet attached to and in fluid communication with said second header of said third group;

a moisture separator connected to and in fluid communication with said fifth outlet of said second heat exchanger portion and said third inlet of said first heat exchanger portion to remove entrained moisture from air passing through said second portion and return demoisturized air to said first heat exchanger portion; and means for introducing a flow of refrigerant into said sixth inlet of said second heat exchanger portion, and for removing said refrigerant from said sixth outlet of said second heat exchanger portion.

2. The improved air dryer for pneumatic systems of claim 1 wherein air flow in said inner channel of each of said first tube units is countercurrent to air flow in said intermediate and outer annuli of each of said first tube units, and flow of said refrigerant is countercurrent with air flow in said inner channel of each of said second tube units and co-current with air flow in said outer annuli of each of said second tube units.

3. The improved air dryer for pneumatic systems of claim 1 wherein the inner and outer tubes of said concentric tubes of said first tube units and said headers of said first portion are substantially identical with the inner and outer tubes of said concentric tubes of said second tube units and said headers of said first portion, said inner and outer tubes of said first and second tube units being cylindrical and said headers of said first and second portions being cylindrical.

4. The improved air dryer for pneumatic systems of claim 1 wherein the intermediate tube of said concentric tubes of said first tube units is cylindrical and the intermediate tube of said concentric tubes of said second tube units is cylindrical at the first and further ends, said ends being connected by a substantially cylindrical member, the walls of said cylindrical member being helicotrema deformed, and said intermediate tubes of said first and second tube units having substantially identical overall lengths and inside and outside diameters at first and further ends.

5. An improved air dryer for removing moisture from compressed air that is to be used in a pneumatic system, said improved air dryer comprising:

a first heat exchanger portion having
 (a) a first plurality of substantially parallel straight tube units, each of said tube units formed of three concentric tubes defining an inner channel, an intermediate annulus and an outer annulus, each of said tube units having a first end and a further end,
 (b) first and second groups of first, second and third straight headers attached, respectively, to said first and further ends of each of said first tube units, said third header of each group being in fluid communication with said inner channels, said second header of each group being in fluid communication with said intermediate annuli and said first header of each group being in fluid communication with said outer annuli,
 (c) a first inlet attached to and in fluid communication with said first header of said first group, said first inlet adapted to receive a flow of said compressed air for said pneumatic system,
 (d) a first outlet attached to and in fluid communication with said first header of said second group,
 (e) a second inlet attached to and in fluid communication with said first outlet and said third header of said second group,
 (f) a second outlet attached to and in fluid communication with said third header of said first group,
 (g) a third inlet attached to and in fluid communication with said second header of said first group, and
 (h) a third outlet attached to and in fluid communication with said second header of said second group, said third outlet adapted to deliver demoisturized air to said pneumatic system;

a second heat exchanger portion having
 (a) a second plurality of substantially parallel straight tube units, each of said tube units formed of three concentric tubes defining an inner channel, an intermediate annulus and an outer annulus, each of said tube units having a first end and a further end,
 (b) third and fourth groups of first, second and third straight headers attached, respectively, to said first and further ends of each of said second tube units, said third header of each group being in fluid communication with said inner channels, said second header of each group being in fluid communication with said intermediate annuli, and said first header of each group being in fluid communication with said outer annuli,
 (c) a fourth inlet attached to and in fluid communication with said second outlet of said first heat exchanger portion and said third header of said third group adapted to receive a flow of air from said first heat exchanger portion,
 (d) a fourth outlet attached to and in fluid communication with said third header of said fourth group,
 (e) a fifth inlet attached to and in fluid communication with said fourth outlet and said first header of said fourth group,
 (f) a fifth outlet attached to and in fluid communication with said first header of said third group,
 (g) a sixth inlet attached to and in fluid communication with said second header of said fourth group, and
 (h) a sixth outlet attached to and in fluid communication with said second header of said third group;

a moisture separator connected to and in fluid communication with said fifth outlet of said second heat exchanger portion and said third inlet of said first heat exchanger portion to remove entrained moisture from air passing through said second portion and return demoisturized air to said first heat exchanger portion;

means for introducing a flow of refrigerant into said sixth inlet of said second heat exchanger portion, and for removing said refrigerant from said sixth outlet of said second heat exchanger portion; and wherein air flow in said inner channel of each of said first tube units is countercurrent to air flow in said intermediate and outer annuli of each of said first tube units, and flow of said refrigerant is countercurrent with air flow in said inner channel of each of said second tube units and co-current with air flow in said outer annuli of each of said second tube units.

6. The improved air dryer for pneumatic systems of claim 5 wherein said tube units of said first portion are arranged in a first plane, said tube units of said second portion are arranged in a second plane substantially parallel to said first plane, said headers of said first portion are substantially parallel and are substantially perpendicular to said first tube units in said first plane, and said headers of said second portion are substantially parallel and are substantially perpendicular to said second tube units in said second plane.

7. The improved air dryer for pneumatic systems of claim 6 wherein the inner and outer tubes of said concentric tubes of said first tube units and said headers of said first portion are substantially identical with the inner and outer tubes of said concentric tubes of said second tube units and said headers of said first portion.

8. The improved air dryer for pneumatic systems of claim 5 wherein said inner and outer tubes of said first and second tube units are cylindrical and said headers of said first and second portions are cylindrical.

9. The improved air dryer for pneumatic systems of claim 5 wherein the intermediate tube of said concentric tubes of said first tube units is cylindrical and the intermediate tube of said concentric tubes of said second tube units is cylindrical at the first and further ends, said ends being connected by a substantially cylindrical member, the walls of said cylindrical member being helicotrema deformed, and said intermediate tubes of said first and second tube units having substantially identical overall lengths and inside and outside diameters at first and further ends.

* * * * *